INVENTORS
RICHARD A. SMITH
BY JOSEPH R. INFANTINO

ATTORNEY.

United States Patent Office 3,125,456
Patented Mar. 17, 1964

3,125,456
RESINOUS ADHESIVE COMPOSITION
Richard A. Smith, Cornwall on the Hudson, and Joseph R. Infantino, Chappaqua, N.Y., assignors to American Machine & Foundry Company, a corporation of New Jersey
Filed Apr. 5, 1961, Ser. No. 100,971
6 Claims. (Cl. 106—189)

This invention relates to resinous adhesive coatings which can be cured to provide hard and tough impact-resistant surfaces and more particularly, to trowelable adhesive coating compositions which, when applied to surfaces, have sufficient fluidity to form a smooth surface prior to attaining rigidity.

In a specific and preferred application, although not limited thereto, the compositions of the invention are highly useful and effective in repairing bowling pins which, through use, have suffered loss of portions of the protective and decorative coating. The compositions of the invention thus serve to restore the appearance as well as the further usefulness of otherwise unsightly and discardable bowling pins.

Due to the various conditions of use, plastic coatings on surfaces often deteriorate to the point where segments of the plastic surfaces chip or wear through to the wood substrates and beyond, upon being struck. The result is unsightly, and in the case of table or countertops, it is generally unsanitary. With respect to bowling pins which are subject to severe use, the loss of surface coatings presents a serious economic factor. For example, according to the American Bowling Congress specifications, when a bowling pin has suffered a coating loss exceeding 2 square inches in the ball-impact area (a band about 1½ inches wide at the belly region of the pin), it must be withdrawn from play. The cost of bowling pins is substantial and disposing of pins in this condition would impose a severe expense. It is, therefore, extremely desirable that a composition suitable to repair these damaged pins be available.

A composition for repairing damaged plastic surfaces, when it is applied to the damaged areas, prevents further damage of the pin, improves the appearance, extends the useful life and avoids splintering or other severe damage to the core or substrate. Some of the desired features of the compositions of this type include ease of use, preferably available as a single composition rather than a plurality of components which must be premixed. It should be inexpensive and tough but not brittle, strongly adhesive and of a consistency that it flows to a smooth glossy surface which requires no finishing when dried.

We have discovered an excellent plastic adhesive repair composition comprising essentially ethyl cellulose, nitrocellulose lacquer, a solvent and a plasticizer which is economical and easily applied directly to the damaged areas of plastic coated wood articles.

It is accordingly a primary object of the invention to provide a novel adhesive coating which adheres strongly to surfaces upon which it is applied and which cures to a smooth, tough, non-brittle condition.

A further object of the invention, is to provide a resinous coating composition well adapted to patch damaged surfaces of bowling pin coatings to restore the contour of the pin and provide a strong, tough, non-brittle bond with the pin core and coating.

Other objects and advantages will become apparent hereinafter the more detailed description of the invention which follows.

The plastic adhesive coating composition of the invention will be described in conjunction with its use in the repair of bowling pins. It will be apparent, however, that the compositions herein disclosed may likewise be employed in a variety of other applications in which a firmly adhering plastic coating is desired. In general, bowling pins in commercial use comprise a maple wood core coated with a plastic pigmented shell consisting of a plurality of coatings. The severe pounding to which these pins are subjected in normal usage invariably results in the chipping and separation of the plastic shell from the wood body. Separation of the plastic shell is particularly acute adjacent the chipped area. In many instances, bowling pins so damaged are otherwise in usable condition, were it not for the fact that they are unsightly, and detract from the aesthetic appearance of the array of pins.

We have found that pins damaged in this manner may be restored to useful life so that the life thereof is extended in the order of 20% to 50% and more. In all cases in which the bowling pins were restored by applying the resinous coating of the invention to damaged areas, no loss of the applied coating or subsequent failure occurred in the repaired areas and all failures when subsequently occurring took place at other than the repaired areas. The surfaces repaired with the composition of the invention moreover have exceptional resistance to dirt pick-up.

Figure 1:
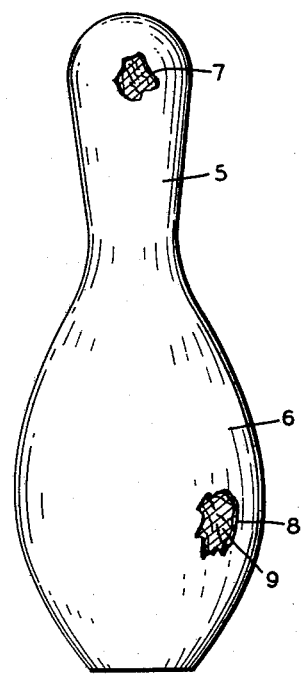
FIG. 1 is a front elevation of a bowling pin showing two areas of damage on the coating.
Figure 3:
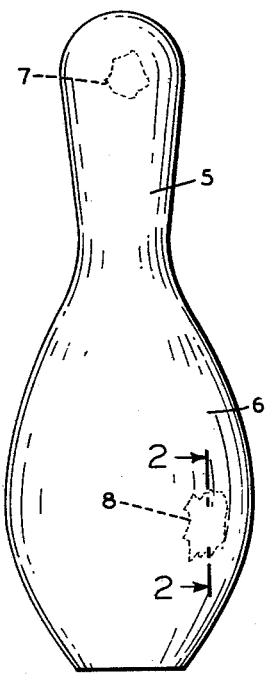
FIG. 3 is a front elevation of the restored bowling pin of FIG. 1 in which the damaged areas are substantially unnoticeable upon being repaired according to the invention.
Figure 2:
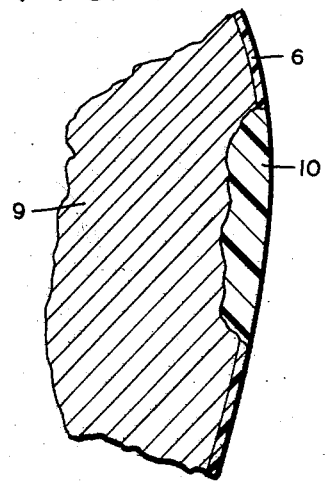
FIG. 2 is an enlarged vertical cross-section of a fragment of the bowling pin in the vicinity of the damaged area upon which coating of the invention has been applied.

The drawing illustrates generally the repair of a damaged bowling pin 5. As shown in FIG. 1 damage at 7 and 8 to the plastic coating 6 is shown at the head and ball-impact area, respectively, of the pin. As shown more clearly in FIG. 2, damage has extended into the pin body 9. The pin after repair with the patch material 10 (see FIG. 2) is shown generally in FIG. 3 in repaired condition.

The invention and its advantages will be further illustrated by the following examples. Unless otherwise specified, parts indicated are parts by weight.

*Example 1*

A blend having a smooth, uniform consistency similar to that of viscous tar was prepared by mixing the following ingredients in a suitable vessel over a period of 20 minutes.

| | Percent |
|---|---|
| Toluene | 44.3 |
| Ethyl alcohol | 14.8 |
| n-Butyl alcohol | 14.8 |
| Ethyl cellulose | 19.7 |
| Pigment-plasticizer [1] | 1.5 |
| Nitrocellulose lacquer [2] | 4.9 |

[1] 50/50 grind of $TiO_2$ pigment and Paraplex RG–2 plasticizer at 70% solids in toluene.
[2] Improves dirt pick up resistance. Any hard drying commercial quality nitrocellulose lacquer may be used. A preferred lacquer and the one employed comprises:

| | Percent |
|---|---|
| ½ sec. RS nitrocellulose | 5.0 |
| 5–6 sec. RS nitrocellulose | 5.0 |
| Toluene | 41.2 |
| Isobutyl acetate | 18.5 |
| n-Butanol | 5.1 |
| Ethanol | 8.0 |
| Ethyl acetate | 17.2 |

The above composition has excellent shelf-life. When stored in a closed container for three weeks no appreciable change in properties is evident. In the use thereof, 40 bowling pins each having damaged areas in which at least 2 square inches of coating loss were repaired. More than one-half of the pins were damaged to the extent that each had at least 4 square inches of loss and chipped area in the plastic coating in the belly and head areas of the pin. These pins were repaired by directly applying the above composition to the damaged areas following the procedure generally described below.

The area is cleansed of loose and splintered wood and plastic.

The adhesive plastic composition of Example 1 is applied in depths of about ¼ inch until level with the contour of the pin. Preferably, a slight excess is applied to allow for shrinkage on drying. The composition is applied with a spatula and smoothed to conform generally with the pin contour. Where the plastic shell or coating is separated from the wooden core near the damaged area of the pin, the plastic adhesive composition is forced below the loosened shell to the extent permitted by the separation.

Where a coating composition that has slight fluidity is employed (in order that the patch material flows to a smooth surface before hardening), the pin is positioned so that the patch area is uppermost at least until the composition is partially hardened and substantially no sagging occurs.

The repaired pins are dried over-night at room temperature. Alternately, the drying may be effected by more rapid means such as employing radiant or oven heat at temperatures up to about 160° F. for a period of from about 30 minutes to 4 hours.

The composition prepared according to Example 1 and remaining from the repair of the above pins, in stored in a sealed container. The composition in a sealed container has an indefinite shelf-life. Two months later the composition, unaltered in composition or substance, is used to repair a second batch of 40 pins similarly damaged, following the procedure described above. The repaired bowling pins are dried under radiant heat at a temperature of 130° F. for 3 hours. Five pins from each of the first and second batches are introduced into an impact tester in which a 16 pound bowling ball is hurled at each of the patched pins so that each pin is struck severely more than 2000 blows at random, each time in the area of the belly region, at a speed of 35 ft. per second. In each of the 3 failures, the point of failure was at places other than the repaired areas. In actual lane testing of the remaining restored pins, the pins were examined after each 100 games of play. All pins survived upward of 500 additional games. Some of the pins survived in excess of 1000 additional games. In each case of subsequent failure, damage due to coating failures was at places other than at the place repaired. The repaired areas retained a good appearance throughout the test period and had excellent resistance to dirt pick-up.

In the composition of the invention the critical ingredients are ethyl cellulose, nitrocellulose lacquer and the conditioner therefor including a solvent and a plasticizer. Generally, a pigment is added to provide the desired color. In preparing the compositions, ethyl cellulose, commercial grades in amounts of from 10–35% and preferably 15–25%, is employed. Most desirable from about 17–77% of ethyl cellulose is embodied in the composition. Ethyl cellulose having viscosity of about 40–150 centipoises (medium ethoxy) provides the desired consistency. The amount of nitrocellulose lacquer based on the weight of ethyl cellulose may vary from about 5 to about 40% and preferably from about 10% to 30%.

Preferably, a nitrocellulose lacquer containing nitrocellulose known commercially as RS type and containing from about 11.8 to 12.8% nitrogen is used. Nitrocellulose with lower nitrogen content (AS or SS types) are more thermoplastic and do not provide the same excellent dirt-resistant properties of the RS type. Viscosity type nitrocellulose preferably used are those from ½ sec. to 30 sec. Above this value the viscosity is so high as to impede proper application of the composition to the damaged area and prevents good penetration into the wood structure.

Plasticizer in amounts from about 0.1% to about 30% may be employed. Ordinarily amounts of from about 0.5% to about 20% based on the weight of the ethyl cellulose is preferred.

Suitable plasticizers which may be used are known to those skilled in the art and are commercially available. Preferably, a plasticizer is employed which is characterized by low migration rate (higher migration rate usually means more dirt pick-up at the surface) and its effectiveness in plasticizing ethyl cellulose when used at low levels i.e. less than 5% solids. Plasticizers which may be used include various esters such as sebacic acid ester available as Paraplex RG–2, phosphoric acid esters e.g. diphenyl ethyl phosphate, tricresyl phosphate etc.; esters of phthalic acid, e.g. diamyl, dibutyl, dioctyl, dinonyl, decyl, diisooctyl phthalate etc.; and various esters of citric, oleic, stearic and adipic acids.

When a pigment is used any of the commercially available pigments known to be compatible with the composition may be used. In the case of bowling pin patch compositions, the pigment is preferably titanium dioxide. The amounts used may vary from about 0.05% to about 10% based on the weight of the ethyl cellulose.

Any of a variety of organic liquids known to be used as solvents may be employed as the solvent system for the plastic coating. Compositions, such as for example, methanol, ethanol, isopropanol, butanol, ethylenedichloride, methylenechloride, toluene, xylene, benzene, ethane, hexane, heptane, Cellosolve and the like or mixtures thereof may be employed. Many solvent systems are possible for the composition of the invention. The essence and novelty lie in the solids or non-volatile portion i.e. ethyl cellulose and its composition with the nitrocellulose and plasticizer. It is these, upon the elimination of solvents through evaporation, that make up the repair composition. The particular solvent system used is preferably chosen so that maximum solids at a workable viscosity is achieved. Suitable organic solvent, such as butyl alcohol, methyl ether of ethylene glycol drying retardant may be included to prevent too rapid evaporation which would result in blushing and greater susceptibility to dirt pick-up of the repaired area.

The ethyl cellulose employed in preparing the compositions of the invention should have a substitution value of between 2.15 and 2.60 ethoxy groups per anhydroglucose unit. Commercially available ethyl cellulose which may be used is available as "medium ethoxy" or as "K" type in which the ethoxy content is 45.0–47.0% and has a degree of substitution of 2.28–2.38. The specific material may be further specified by its viscosity. The preferred viscosity is between 50 and 100 centipoises which designates the viscosity of 5% ethyl cellulose in a mixture of 80:20 toluene:ethanol at 25° C.

The use of higher viscosity material at lower solids content in the patch is possible but due to its lower solids content does not form as substantial an impact-resistant thickness in one application and it may be necessary to apply several layers with drying between applications to produce a comparably good patch.

When ethyl cellulose having viscosity lower than 50 centipoises is used, the hardened composition has an inferior impact-resistance which is not as resistant to damage in actual use. Ethyl cellulose comprises the bulk of the cured product. Following evaporation of the solvent after cure, ethyl cellulose comprises from about 85% to about 98% by weight of the repair composition. The remainder comprising nitrocellulose, pigment, plasticizer and non-critical modifiers. The resinous adhesive composition as noted hereinabove preferably has a viscous consistency which permits the resinous mass to be trowelled but preferably such that no substantially flow or sag occurs following application at room temperature. When prepared for use, the composition of the invention has an ethyl cellulose content based on the total weight (including solvents) of from about 10% to 35% and preferably from about 15% to about 25%.

In each of the formulations set forth hereinbelow as Example 2–5, the adhesive composition was blended as described in Example 1. With each composition, 40 pins having coatings damaged to the extent that each had a minimum damage of two square inches and average damage was about 3.5 inches, were repaired. In each case, the patched bowling pins were satisfactory. Failure occurred at places other than the patch areas. The applied coating remained clean and resistant to dirt pick-up over the life of the pins.

*Example 2*

| | Percent |
|---|---|
| Toluene | 45.0 |
| n-Butanol | 14.3 |
| Ethanol | 14.3 |
| Ethyl cellulose, 100 cps. medium ethoxy | 19.8 |
| Pigment-plasticizer [1] | 1.6 |
| Nitrocellulose lacquer [2] | 5.0 |

[1] 50/50 grind of Paraplex RG-2 and TiO$_2$.
[2] 10% solution of 5–6 sec. RS nitrocellulose in butyl acetate (45%), toluene (20%), n-butanol (23%), isopropanol (12%).

*Example 3*

| | Percent |
|---|---|
| Toluene | 43.0 |
| n-Butanol | 13.3 |
| Ethanol | 13.3 |
| Ethyl cellulose, 50 cps. medium ethoxy | 23.8 |
| Pigment-plasticizer | 1.6 |
| Nitrocellulose lacquer | 5.0 |

*Example 4*

| | Percent |
|---|---|
| Toluene | 42.0 |
| n-Butanol | 13.0 |
| Ethanol | 13.0 |
| Ethyl cellulose, 100 cps. medium ethoxy | 19.8 |
| Pigment-plasticizer | 1.9 |
| Nitrocellulose lacquer | 10.3 |

*Example 5*

| | Percent |
|---|---|
| Xylene | 41.5 |
| n-Butanol | 10.4 |
| Ethanol | 9.4 |
| Ethyl acetate | 12.3 |
| Ethyl cellulose, 100 cps. medium ethoxy | 19.8 |
| Pigment-plasticizer | 1.6 |
| Nitrocellulose lacquer | 5.0 |

It is apparent to those skilled in the art that various modifications may be made in the teaching presented without departing from the scope of the invention. Accordingly, the invention is not to be limited except insofar as necessitated by the appended claims.

We claim:
1. A plastic adhesive composition of uniform consistency which is curable to a smooth, hard, non-brittle resinous state consisting essentially of from about 10% to about 35% by weight based on the total weight of the composition of ethyl cellulose having a viscosity of from about 50 to 100 centipoises; from about 0.5% to about 14%, based on the total weight of the composition, of nitrocellulose; from about 0.01% to about 10.5% by weight of a plasticizer for the ethyl cellulose based on the total weight of the composition; and an organic solvent which is compatible with ethyl cellulose in amounts to permit said composition to flow just sufficient to produce a substantially smooth surface before curing to a rigid state.

2. A trowelable plastic adhesive composition which is curable to a smooth hard non-brittle resinous state consisting essentially of from about 15% to about 25% by weight based on the total weight of the composition of ethyl cellulose having a viscosity of from about 50 to 100 centipoises; from about 1.5% to about 7.5%, based on the total weight of the composition, of nitrocellulose; from about 0.05% to about 2.5% by weight based on the total weight of the composition of a pigment and from about 0.0075% to about 5% by weight based on the total weight of the composition of a plasticizer for the ethyl cellulose, blended with an organic solvent system compatible with ethyl cellulose in amounts sufficient to permit said composition to flow and produce a substantially smooth surface before curing to a rigid state.

3. The composition of claim 2 in which organic solvent system comprises toluene and n-butyl alcohol.

4. The composition of claim 2 in which the organic solvent system comprises toluene, ethyl alcohol and n-butanol.

5. The composition of claim 2 in which organic solvent system comprises toluene, n-butanol and an alcohol selected from the group consisting of methanol, ethanol and propanol.

6. The composition of claim 5 in which the plasticizer comprises an organic ester.

References Cited in the file of this patent

UNITED STATES PATENTS

| 2,569,883 | Doelling et al. | Oct. 2, 1951 |
| 2,580,079 | Phillips | Dec. 25, 1951 |
| 2,804,399 | Kelley et al. | Aug. 27, 1957 |
| 2,804,400 | Kelley et al. | Aug. 27, 1957 |
| 2,895,844 | Bader et al. | July 21, 1959 |
| 2,911,315 | Fookes et al. | Nov. 3, 1959 |

UNITED STATES PATENT OFFICE
CERTIFICATE OF CORRECTION

Patent No. 3,125,456            March 17, 1964

Richard A. Smith et al.

It is hereby certified that error appears in the above numbered patent requiring correction and that the said Letters Patent should read as corrected below.

Column 3, line 33, for "in", first occurrence, read -- is --; line 63, for "77%" read -- 22% --; column 6, line 27, for "0.05%" read -- 0.0075% --.

Signed and sealed this 4th day of August 1964.

(SEAL)
Attest:

ERNEST W. SWIDER
Attesting Officer

EDWARD J. BRENNER
Commissioner of Patents